United States Patent Office 3,331,269
Patented July 18, 1967

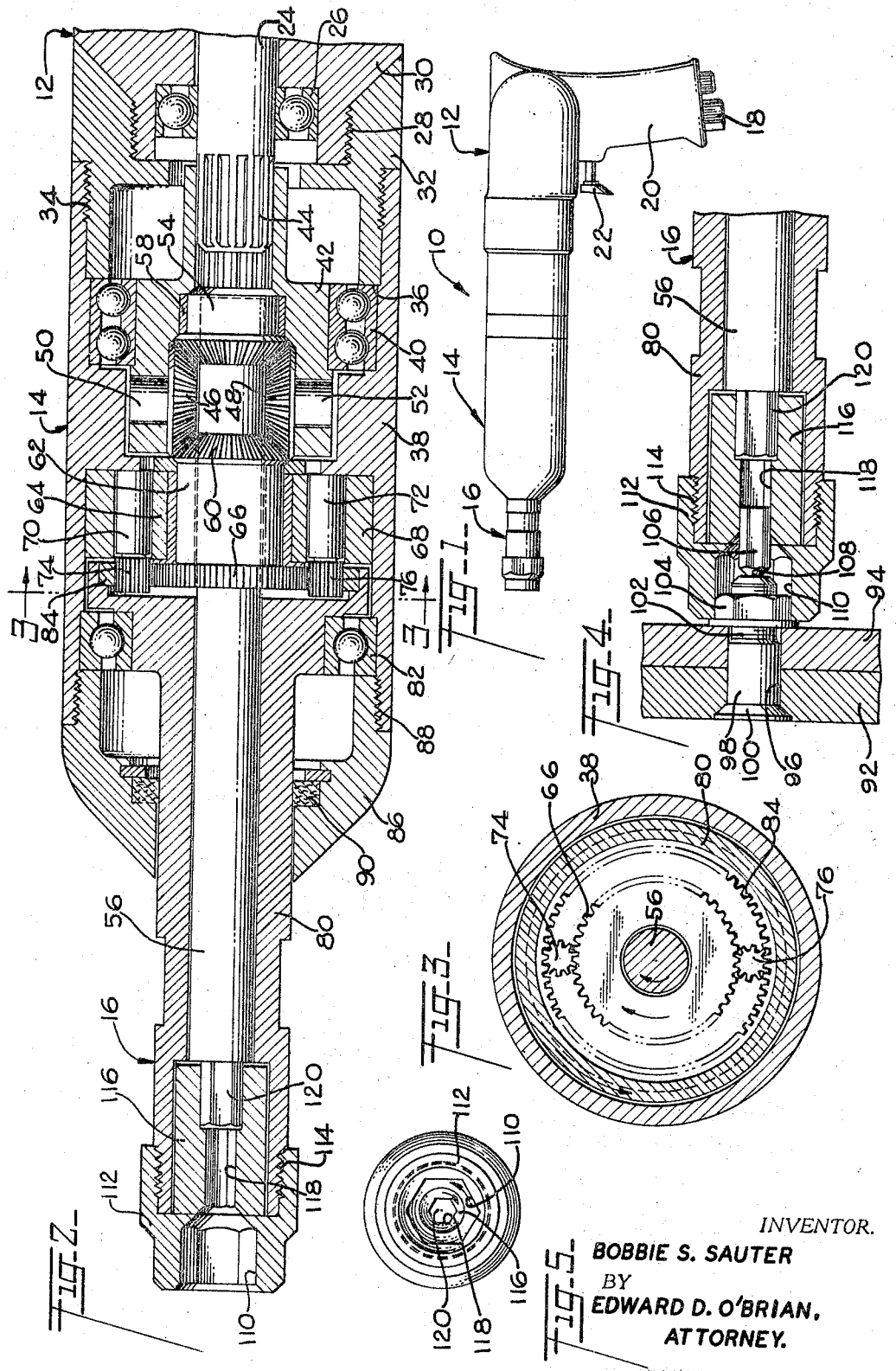

3,331,269
DRIVING GUN
Bobbie S. Sauter, Newport, Calif., assignor to Standard Pressed Steel Co., Santa Ana, Calif., a corporation of Pennsylvania
Filed Aug. 16, 1965, Ser. No. 480,060
6 Claims. (Cl. 81—57)

This invention is directed to a driving gun for relatively driving a nut with respect to its bolt.

Nuts and bolts are very old means for fastening two members together. A bolt hole is provided through the two members, a headed bolt is placed through the bolt hole, and a nut is pulled up tight upon the bolt. Nut drivers are known. These nut drivers conventionally are capable of providing a large torque to a nut engaging socket, and the torque is measured by the turning torque of the nut driving gun in the hands of the operator. This method is inaccurate, and the tendency is to tighten nuts too tight. Furthermore, recently developed bolts have torque limiting means extending outwardly beyond the portion of the threads upon which the nut is engaged. This torque limiting means is attached to the bolt by a shear section of accurately predetermined size so that tightening torque may be accurately predetermined. However, suitable driving guns for such torque bolts have not previously been available so that the torque bolts have not been used to the fullest extent possible.

Accordingly, it is an object of this invention to provide a driving gun particularly adapted for the driving of bolts having shear-off torque control sections for the control of maximum tightening torque thereof.

It is a further object of this invention to provide a torque bolt driving gun which quickly and accurately tightens the nut on such a torque bolt to the desired torque limit and thereupon does not cause further tightening so that torque bolts can be more quickly and more accurately installed at the proper torque limit so as to increase the ease of use and accuracy of use of such torque bolts.

It is a further object of this invention to provide a driving gun for torque bolts which comprises first and second driving members, which members rotate in opposite directions, one of which members is engageable with the nut upon the bolt and the other which is engageable with the torque limiting extension on the bolt, with the driving gun internal structure arranged so that when the torque limiting extension is sheared off no further driving torque is applied to the nut.

Other objects and advantages of this invention will become more apparent from a study of the following portion of this specification, the claims and the attached drawings in which:

FIG. 1 is a side elevational view of the driving gun of this invention;

FIG. 2 is an enlarged longitudinal section through a portion of the driving gun;

FIG. 3 is a section taken generally along the line 3—3 of FIG. 2;

FIG. 4 is a partial section of the driving end of the driving gun shown in engagement with a torque bolt and nut; and FIG. 5 is a partial left end elevational view of the structure of FIG. 2.

As an aid to understanding this invention it can be stated in essentially summary form that it is directed to a driving gun. The driving gun has motive power means, the rotation of which is controlled by the operator. The motive power means has an output shaft which drives the carrier ring of a differential. The carrier ring carries at least one bevel gear, and two bevel gears are in engagement with the gear on the carrier ring. One of these bevel gears is connected to one of the driver elements, and the other is connected through reversing gearing to the other of the drivers. One of the drivers is adapted to engage the torque limiting extension on the bolt, while the other driver is adapted to engage the nut mounted upon the bolt.

This invention will be understood in greater detail by reference to the following portion of the specification wherein the drawings are described in detail. Referring now to the drawings, the driving gun of this invention is generally indicated at 10. The driving gun 10 generally comprises the power section 12, the gear case 14 and the driving end 16.

The power section 12 contains a suitable propulsion motor for the driving gun 10. It is preferably a compressed air driven motor, for such are quite light for the ouput power, are easily controllable and compressed air is usually available in industrial applications. A compressed air inlet 18 is provided for suitable attachment of a conventional compressed air hose. Driving gun 10 has a handle for convenient manageability of the gun. The handle 20 carries trigger 22 which controls the air to the air motor, so that the operator may control the torque and speed thereof. The power section 12 is conventional, and terminates in drive shaft 24 carried on bearing 12. Power section 12 conventionally terminates in threads 28 and cone 30 for the attachment of further equipment thereto. Other motive means than an air motor may be used therein, if desired.

Gear case 14 comprises adapter 32 screwed onto threads 28 and in engagement with cone 30. Adapter 32 has further threads 34 and terminates in boss 36. Gear case 14 has sleeve 38 which screws on threads 34. Sleeve 38 carries ring bearing 40 which is engaged by boss 36 as a bearing retainer.

Mounted within ring bearing 40 is ring carrier 42 which engages over splines 44 of drive shaft 24 so as to be driven thereby. Carrier 42 carries differential bevel pinions 46 and 48 which are respectively rotatably mounted on shafts 50 and 52 which are mounted in ring carrier 42. Differential gear 54 is mounted on shaft 56 so that shaft 56 rotates therewith. Differential gear 54 is mounted in bearing 58 so that it may rotate relatively to ring carrier 42. Thus, shaft 56 is driven by one side of the differential structure.

Differential gear 60 is in engagement with differential bevel pinions 46 and 48, and is carried upon the end of sleeve 62. Sleeve 62 is mounted for rotation in gear case 14 on bearing 64. Sun gear 66 is also mounted upon sleeve 62 so as to be driven as the other half of the differential output. Ring 68 is fixedly mounted in sleeve 38 and rotatably cerries therein planet shafts 70 and 72. Each of the planet shafts carries a gear, planet gears 74 and 76, respectively, and these gears are in engagement with sun gear 66.

Shaft 80 is hollow and carries shaft 56 coaxially through the center thereof. Shaft 80 is rotatably mounted on bearing 82 which is positioned within sleeve 38. Shaft 80 carries ring gear 84 which is in engagement with planet gears 74 and 76. Thus, shaft 80 rotates in the opposite direction from shaft 56, and the two of them are the two differential outputs. Thus, when one turns free the other has virtually no torque. End bell 86 is engaged in threads 88 on sleeve 38 and serves as a retainer for bearing 82. Seal 90 retains lubricant with gear case 14.

As is best seen in FIGS. 2, 4 and 5, each of the shafts 56 and 80 has engagement means on the end for engaging upon the appropriate parts of a torque bolt. As is seen in FIG. 4, members 92 and 94 have a bolt hole 96 therein and torque bolt 98 passing therethrough. The torque bolt has a head 100 and threads 102. Nut 104 is engaged upon threads 102. Torque bolt 98 has a torquing extension 106 which is integral with the main body of bolt 98 and is secured to the end of the bolt beyond the end of threads 102 by means of a reduced shear area 108. The reduced shear area 108 is of such size that when considering a plurality of factors, the torquing extension 106 shears off when the proper torque of nut 104 on threads 102 is reached. These factors are well known in the art and include the shear strength of the material of the bolt 96, the angle of threads 102, the friction loss between threads 102 and nuts 104, the modulus of elasticity of the material of bolt 98, the character of the threads 102 including their root diameter and surface finish and the desired tension in the shank of bolt 98. When these factors are all calculated together, reduced shear area 108 is determined. The only remaining necessary operation to tighten bolt 98 to the desired tension is to relate the torque on torquing extension 106 to the torque on nut 104. It is clear that driving gun 10 supplies this relationship.

In order to actually apply the torque, a nut driving recess 110 is formed within collet 112 which in turn is screwed upon threads 114 on shaft 80. The nut driving recess 110 is of such dimensions as to properly embrace the exterior of nut 104. Similarly, collet 116 is formed with a recess 118 of suitable size to engage upon and drive torquing extension 106. Collet 116 is driven by shaft 56 by means fo hex driver 120. Collets 112 and 116 are removable and interchangeable with other sizes so as to make the driving gun 10 suitable for different sizes of bolts 98 and nuts 104.

In operation, the bolt 98 is placed through the members 92 and 94, the nut 104 is hand threaded on to the threads 102 and driving gun 10 is put into place. When it is in place, collet 112 engages the nut and collet 116 engages the torquing extension. The operator then operates trigger 22 so as to run the gun at the desired speed. It must be remembered that the drive to shafts 56 and 80 is through a differential. Thus, if friction characteristics so dictate, the bolt 98 may not rotate within the members 92 and 94. However, the torque for driving the nut 104 is caused by the torque on torquing extension 106. Thus, as driving torque upon the nut 104 increases, the torque upon torquing extension 106 increases. If the gear train within gear case 14 is so designed, these torques may be equal so that there is no torque upon the operator holding the driving gun 10. In the present gun there is a slight amount of such torque due to the speed reducing effects of sun gear 66, planet gears 74 and 76 and ring gear 84. However, this torque is always proportional to the torque upon torquing extension 106, and the torque on the torquing extension is not dependent upon the operator. As the torque rises, and the shear area 108 shears, the torquing extension 106 is free from the body of bolt 98, so that collet 116 and shaft 56 are permitted to run free. With the shaft 56 running free, the differential transmits no appreciable torque to the collet 112. Thus, the nut is uniformly tightened in accordance with the shear torque of torquing extension 106. The torquing extension 106 is readily removed by pointing the collet 116 downward, and shaking the gun. The gun is then ready for the tightening of the next torque bolt.

It is clear from this specification and these drawings that the driving gun of this invention is susceptible to numerous modifications and changes within the spirit of the invention and without the exercise of the inventive faculty. Accordingly, the scope of this invention is defined by the scope of the following claims.

I claim:
1. A driving gun, said driving gun having a power section, a gear case and a driving end;
   said power section having motive means, said motive means being adapted to be controlled, the improvement comprising:
   a differential in said gear case, said differential comprising a carrier, said carrier being connected to be driven by said motive means, a carrier gear on said carrier, a first gear in engagement with said carrier gear, a first shaft connected to rotate with said first gear, a second gear in said differential, said second gear being in engagement with said carrier gear;
   reversing gearing in said gear case, said reversing gearing comprising a sun gear, said sun gear being connected to rotate with said second gear of said differential, a planet gear having an axis, said axis of said planet gear being fixed with respect to said gear case, said planet gear being in engagement with said sun gear, a ring gear in engagement with said planet gear;
   said driving end having first and second collets, said first collet being connected to rotate with said first shaft, said second collet being connected to rotate with said ring gear so that said first and second collets are connected to be driven in opposite directions upon operation of said motive means, said first and second collets being adapted to be engaged upon a bolt and a nut upon the bolt, respectively.

2. The driving gun of claim 1 wherein said power section, said gear case and said driving end are a unitary structure.

3. The driving gun of claim 1 wherein said first and second collets are respectively removable from said first and second shafts.

4. The driving gun of claim 1 wherein said first shaft and said second shaft each have an axis, said axes of said first and second shafts being substantially coaxial.

5. The driving gun of claim 4 wherein said motive means and said differential and said reversing gearing each have an axis, said axes of said motive means, said differential, said reversing means, said first and second shafts being substantially coaxial.

6. A driving gun, said driving gun comprising:
   a power section, a gear case and a driving end;
   said power section comprising motive means, said motive means having an output shaft rotatable upon energization of said motive means;
   said gear case comprising a differential and reversing means;
   said differential comprising a carrier connected to said output shaft of said motive means so as to rotate therewith, a carrier gear mounted upon said carrier, a first shaft extending into said differential and being arranged coaxial with said output shaft, a first differential gear on said first shaft, said first differential gear being in engagement with said carrier gear, a second differential gear, said second differential gear being coaxially rotatable about said first shaft, said second differential gear being in engagement with said carrier gear;
   said reversing means comprising a sun gear, said sun gear being connected to rotate with said second differential gear, a planet gear having an axis, said axis of said planet gear being fixed with respect to said gear case, said planet gear being in engagement with said sun gear, a ring gear rotatably mounted in said gear case coaxially with respect to said first shaft, said ring gear being in engagement with said planet gear, a second shaft connected to said ring gear, said second shaft rotating coaxially with said first shaft;

said first and second shafts extending to said driving end, a first collet removably connected to said first shaft, a second collet removably connected to said second shaft, said first collet being adapted to engage the torquing extension of a torque bolt and said second collet being adapted to engage a nut on the torque bolt so that upon activation of said motive means said first and second shafts and said first and second collets are torqued in opposite directions.

References Cited

UNITED STATES PATENTS

| | | | |
|---|---|---|---|
| 1,343,667 | 6/1920 | Evensen | 81—56 |
| 1,800,094 | 4/1931 | Muhlenbruck | 74—665 |
| 1,813,739 | 7/1931 | Haptonstall | 74—665 |
| 2,777,346 | 1/1957 | Brame | 81—57 X |
| 3,041,902 | 7/1962 | Wing | 81—56 |

JAMES L. JONES, Jr., *Primary Examiner.*